US012742695B2

(12) United States Patent
Chiou et al.

(10) Patent No.: US 12,742,695 B2
(45) Date of Patent: Sep. 22, 2026

(54) PRESSURE SENSOR DEVICE WITH A PROGRESSIVE STOPPER

(71) Applicant: Vitesco Technologies USA, LLC, Auburn Hills, MI (US)

(72) Inventors: Jen-Huang Albert Chiou, Ponte Vedra, FL (US); Jeffrey Frye, Grayslake, IL (US); Daniel J. Bratek, Arlington Heights, IL (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 1003 days.

(21) Appl. No.: 18/049,398

(22) Filed: Oct. 25, 2022

(65) Prior Publication Data

US 2024/0133756 A1 Apr. 25, 2024
US 2024/0230440 A9 Jul. 11, 2024

(51) Int. Cl.
*G01L 9/00* (2006.01)
*G01L 9/06* (2006.01)
*G01L 19/06* (2006.01)

(52) U.S. Cl.
CPC .......... *G01L 9/0044* (2013.01); *G01L 9/0051* (2013.01)

(58) Field of Classification Search
CPC . G01L 9/00–12; G01L 9/0044; G01L 9/0051; G01L 19/06
See application file for complete search history.

(56) References Cited

U.S. PATENT DOCUMENTS 4,612,812 A * 9/1986 Broden ................. G01L 9/0048 361/283.4
4,782,319 A * 11/1988 Dell'Acqua .......... G01L 9/0055 338/42
5,381,299 A * 1/1995 Provenzano ........... H04R 19/00 361/283.4
5,614,678 A * 3/1997 Kurtz .................... G01L 9/0055 338/42
7,679,154 B2 * 3/2010 Benzel ................ B81C 1/00182 257/419

(Continued)

FOREIGN PATENT DOCUMENTS

EP 0373536 A2 * 6/1990 ........... G01L 9/0075
EP 0567482 B1 * 7/1994 ........... G01L 9/0073
JP 2020016559 A * 1/2020 ............. G01L 19/06

OTHER PUBLICATIONS

Machine Translation of EP-0373536-A2 (Year: 1990).*

*Primary Examiner* — Nguyen Q. Ha

(57) ABSTRACT

A progressive stopper for a pressure sensing element is able to redistribute and reduce the stress of a diaphragm exposed to high pressure via multi-step contacts, such as at least dual contacts, where the diaphragm (designed for detecting pressure within a defined pressure range) is enabled to withstand much higher pressures above of the defined pressure range, such that the progressive stopper prevents catastrophic failure of the diaphragm. The progressive stopper is created to redistribute and reduce stress on the diaphragm significantly and effectively. The progressive stopper does not limit the output of the pressure sensing element such that the pressure sensing element is able to maintain the output voltage above the maximum output voltage of the defined pressure range when the diaphragm is exposed to high pressures with reduced stresses and strains.

10 Claims, 13 Drawing Sheets

(56) References Cited

U.S. PATENT DOCUMENTS

| | | | | |
|---|---|---|---|---|
| 8,925,388 | B2 * | 1/2015 | Hugel | G01L 9/0075 73/756 |
| 9,963,340 | B2 * | 5/2018 | Brown | B81C 1/00158 |
| 10,638,236 | B2 * | 4/2020 | Klein | H04R 31/00 |
| 11,181,431 | B2 * | 11/2021 | Tokuda | G01L 27/005 |
| 11,237,043 | B2 * | 2/2022 | Rombach | G01H 11/06 |
| 2015/0264462 | A1 * | 9/2015 | Okugawa | H04R 19/005 381/174 |
| 2016/0103031 | A1 * | 4/2016 | Tham | B22F 12/90 264/497 |

* cited by examiner 24
24a
34
32c
32a
50b
48a
48c
50a
48b
56
48d
34
52b
46
54b
54a
52a
32b
30
34
26
28
32

24
26
34
24a
32a
86
86a
46
88
88a
34
86b
32c
34
32b
28
32

PRESSURE SENSOR DEVICE WITH A PROGRESSIVE STOPPER

FIELD OF THE INVENTION

The invention relates generally to a pressure sensor assembly having a pressure sensing element which includes at least one progressive stopper to reduce the stress of the pressure sensing element as pressure applied to the diaphragm of the pressure sensing element is increased.

BACKGROUND OF THE INVENTION

A typical ceramic pressure sensing element is formed by a ceramic support substrate bonded with a ceramic diaphragm substrate by a sealing glass having a circular aperture inside the sealing glass to form a diaphragm using the thickness of the sealing glass to create a gap between the ceramic support substrate and the diaphragm substrate. The gap allows the diaphragm to deform when the pressure is applied at the bottom surface of the diaphragm. The pressure sensing element includes four piezoresistors connected into what is known as a "Wheatstone Bridge" configuration. The piezoresistors are printed on the diaphragm so as to detect deflection of the diaphragm due to pressure changes. These MEMS pressure sensing elements are manufactured in different sizes and used for various applications.

In some applications, a pressure sensing element designed to detect pressures from 0 to 10 Bar may be exposed to extremely high pressures, such as pressures up to 200 Bar. However, these types of pressure sensing elements are unable to withstand exposure to such high pressures due to the requirement of the diaphragm having a small thickness, which is required for sufficient pressure sensitivity. For example, a crack at the edge of the diaphragm may occur when the pressure sensor is exposed to a pressure of 200 Bar. The crack is the result of the maximum stress exceeding the ceramic flexural strength.

Accordingly, there exists a need for a pressure sensor which is able to withstand exposure to pressures up to 200 Bar, while maintaining accurate voltage output for a desired operating pressure range.

SUMMARY OF THE INVENTION

In an embodiment, the present invention is a progressive stopper for a pressure sensing element, which in an embodiment is formed by a ring-over-ring stopper on top of a diaphragm to redistribute and reduce the stress of the diaphragm, such that the diaphragm (which is designed for detecting pressure up to 10 Bar) is able to withstand exposure to pressures up to 200 Bar, such that the progressive stopper prevents catastrophic failure of the diaphragm. In an embodiment, the ring-over-ring stopper is a dual-contact ring stopper formed by a thinner inner ring and a thicker outer ring. When pressure applied to the diaphragm is increased, the diaphragm is deformed, the inner radius of the outer ring firstly contacts the bottom of the support substrate to limit the diaphragm deformation. When pressure is further increased, the diaphragm further deforms to move the inner ring such that the inner radius or opening of the inner ring secondly contacts the bottom of the support substrate, further limiting the deformation of the diaphragm. The ring-over-ring stopper is created to redistribute and reduce stress on the diaphragm significantly. The stopper does not limit the output of the pressure sensing element such that the pressure sensing element is able to maintain the output voltage above when the diaphragm is exposed to a pressure of a minimum of 10 Bar, without falling below 10 Bar. In a non-limiting example, for a pressure sensing element designed to detect pressures up to 10 Bar having a progressive stopper according to the present invention, the output voltage for when the pressure applied is above 10 Bar may be clipped via an ASIC as detecting pressure above 10 Bar is not necessary (i.e., the output voltage when the pressure is above 10 Bar may remain a constant voltage output).

In an embodiment, the present invention is a pressure sensor assembly which includes a housing having a port, a pressure sensing element having a support substrate located in a cavity in the housing, a sealing glass layer bonded to the support substrate, the sealing glass layer located in the cavity in the housing, and a diaphragm substrate bonded to the sealing glass layer, the diaphragm substrate located in the cavity in the housing. A diaphragm is part of the diaphragm substrate, and the diaphragm is selectively exposed to fluid pressure in the port. The pressure sensing element also includes a plurality of resistors coupled to the diaphragm such that the plurality of resistors are located between the diaphragm substrate and the support substrate, and at least one progressive stopper is integrally formed with one of the diaphragm substrate or the support substrate. A first portion of the at least one progressive stopper is in contact with one of the at least one of the diaphragm substrate or the support substrate when pressure applied to the diaphragm is above a first predetermined value, and a second portion of the of the at least one progressive stopper is in contact with the other of the at least one of the diaphragm substrate or the support substrate when pressure applied to the diaphragm is above a second predetermined value.

In an embodiment, the progressive stopper includes a first stopper ring mounted to the diaphragm substrate, and a second stopper ring mounted to the diaphragm substrate such that the first stopper ring and the second stopper ring are in contact with and adjacent to one another. In an embodiment, the first stopper ring contacts the support substrate when the pressure applied to the diaphragm is above the first predetermined value, and both the first stopper ring and the second stopper ring contact the support substrate when the pressure applied to the diaphragm is above a second predetermined value.

In an embodiment, the first stopper ring is taller than the second stopper ring.

In an embodiment, at least one of the resistors is circumscribed by the at least one progressive stopper.

In an embodiment, the progressive stopper includes a first stopper ring mounted to the diaphragm substrate, a second stopper ring mounted to the diaphragm substrate such that the second stopper ring is circumscribed by the first stopper ring, and a third stopper ring mounted to the diaphragm substrate such that the third stopper ring is circumscribed by the second stopper ring. In an embodiment, the first stopper ring contacts the support substrate when the pressure applied to the diaphragm is above the first predetermined value, both the first stopper ring and the second stopper ring contact the support substrate when the pressure applied to the diaphragm is above the second predetermined value, and the first stopper ring, the second stopper ring, and the third stopper ring all contact the support substrate when the pressure applied to the diaphragm is above a third predetermined value.

In an embodiment, one of the first stopper ring, the second stopper ring, or the third stopper ring is of a square shape.

In an embodiment, the progressive stopper includes a first recess integrally formed as part of the support substrate, a first contact area integrally formed as part of the first recess, a second recess integrally formed as part of the support substrate, and a second contact area integrally formed as part of the second recess. In an embodiment, the first contact area contacts the diaphragm substrate when the pressure applied to the diaphragm is above the first predetermined value, and both the first contact area and the second contact area contact the diaphragm substrate when the pressure applied to the diaphragm is above a second predetermined value.

In an embodiment, the progressive stopper includes a third recess integrally formed as part of the support substrate, and a contact area integrally formed as part of the third recess. The third contact area contacts the diaphragm substrate when the pressure applied to the diaphragm is above a third predetermined value.

In an embodiment, the progressive stopper includes a curved recess integrally formed as part of the support substrate, and at least one contact area integrally formed as part of the curved recess. In an embodiment, the contact area contacts the diaphragm substrate when the pressure applied to the diaphragm is above a predetermined value.

In an embodiment, the progressive stopper includes a stopper ring connected to the diaphragm substrate, a recess integrally formed as part of the support substrate, a contact area integrally formed as part of the recess, and an inner surface is integrally formed as part of the recess. The contact area contacts the diaphragm substrate when the pressure applied to the diaphragm is above the first predetermined value, and when the pressure applied to the diaphragm is above a second predetermined value, the stopper ring contacts the inner surface and the contact area contacts the diaphragm substrate.

In an embodiment, the contact area is an edge of the recess.

In an embodiment, the progressive stopper includes a second recess integrally formed as part of the support substrate, where the second recess extends further into the support substrate than the first recess, and the second recess and the first recess are approximately concentric. The progressive stopper also includes a second contact area integrally formed as part of the second recess, and an inner surface integrally formed as part of the second recess. When the pressure applied to the diaphragm is above a third predetermined value, the stopper ring contacts the inner surface of the second recess, the first contact area contacts the diaphragm substrate, and the second contact area contacts the diaphragm substrate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
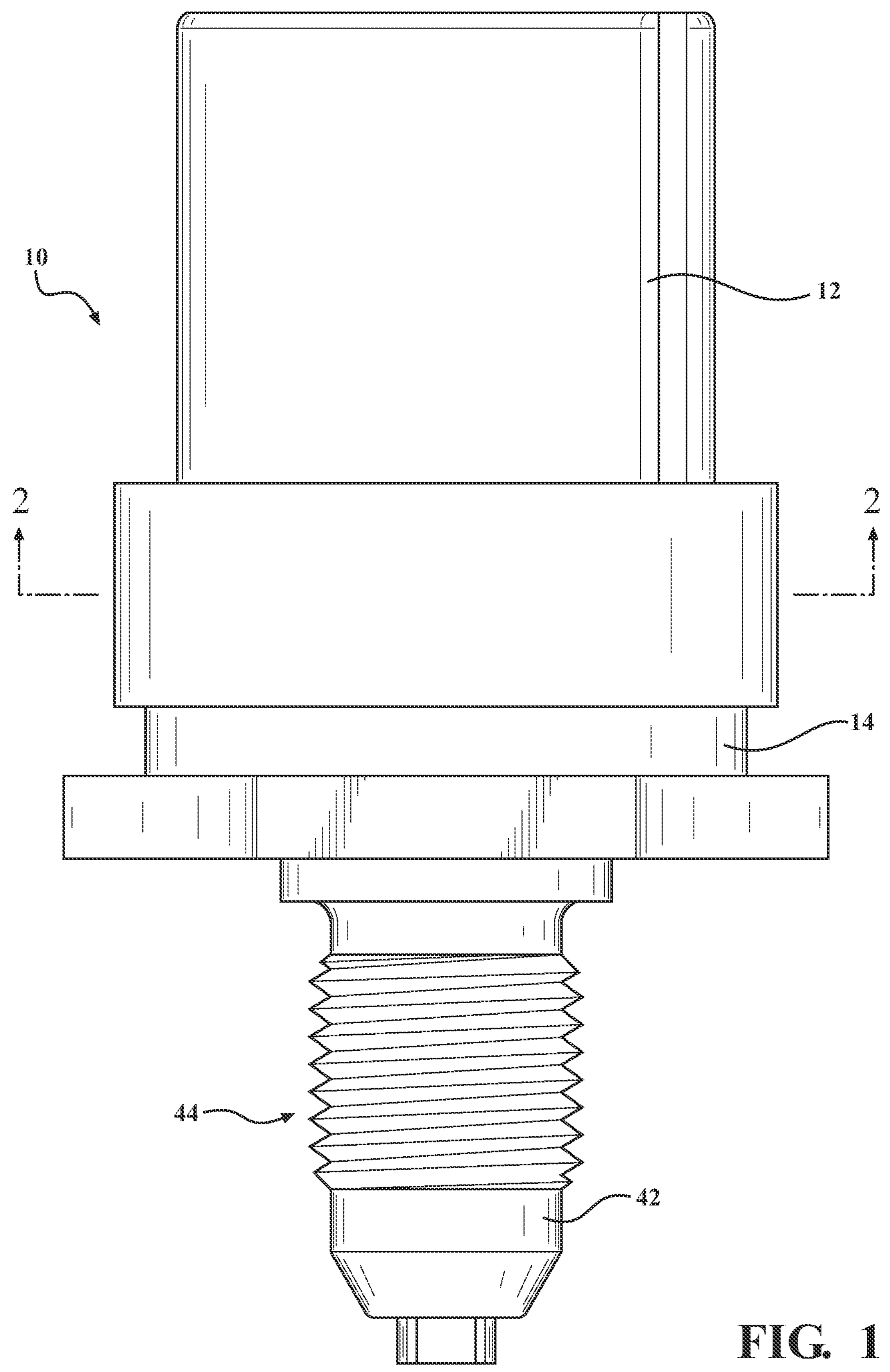
FIG. 1 is a perspective view of a pressure sensor assembly which includes a pressure sensing element having a progressive stopper for reducing the peak diaphragm stress, according to embodiments of the present invention.
Figure 2:
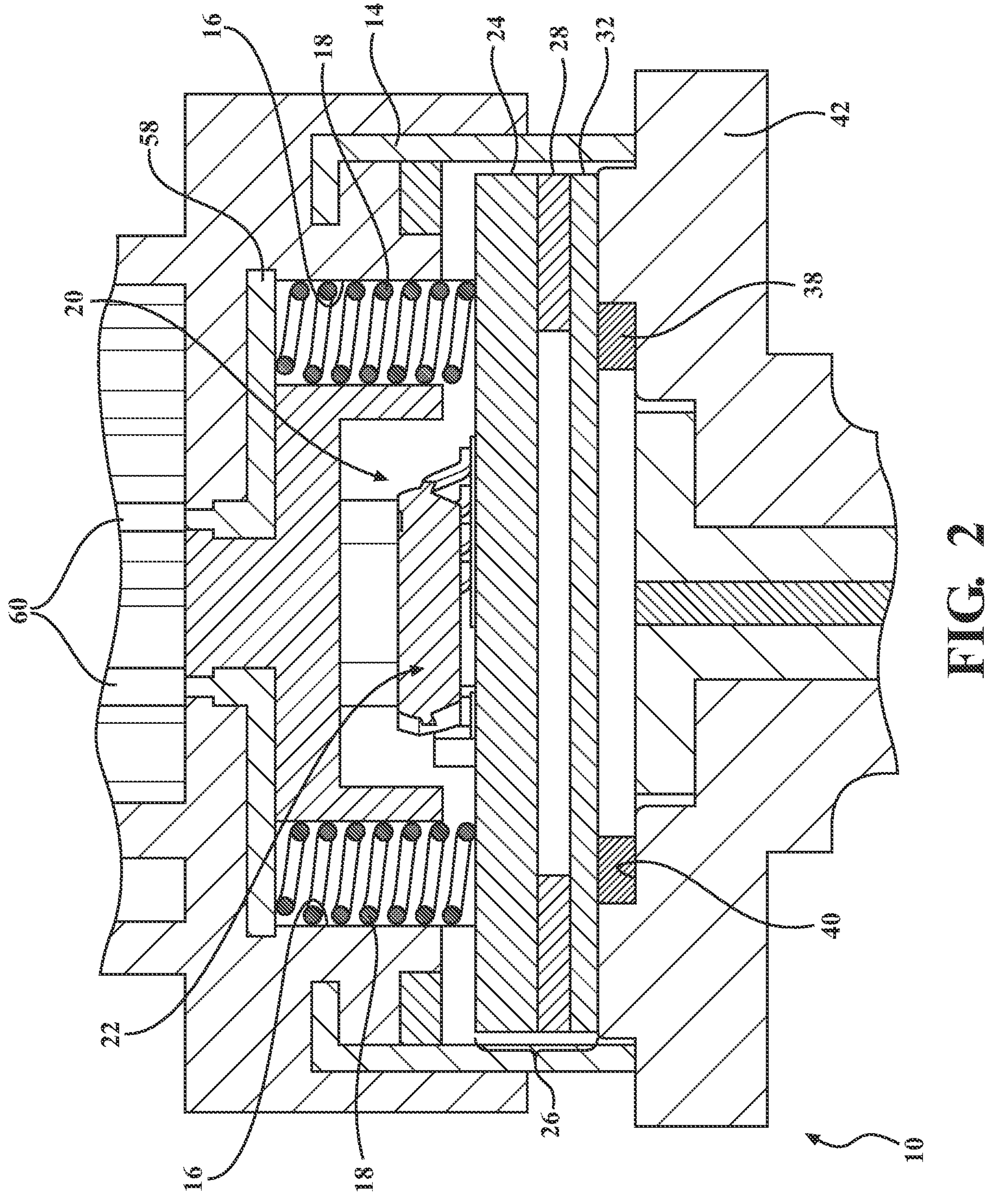
FIG. 2 is sectional view taken along lines 2-2 in FIG. 1.
Figure 3:
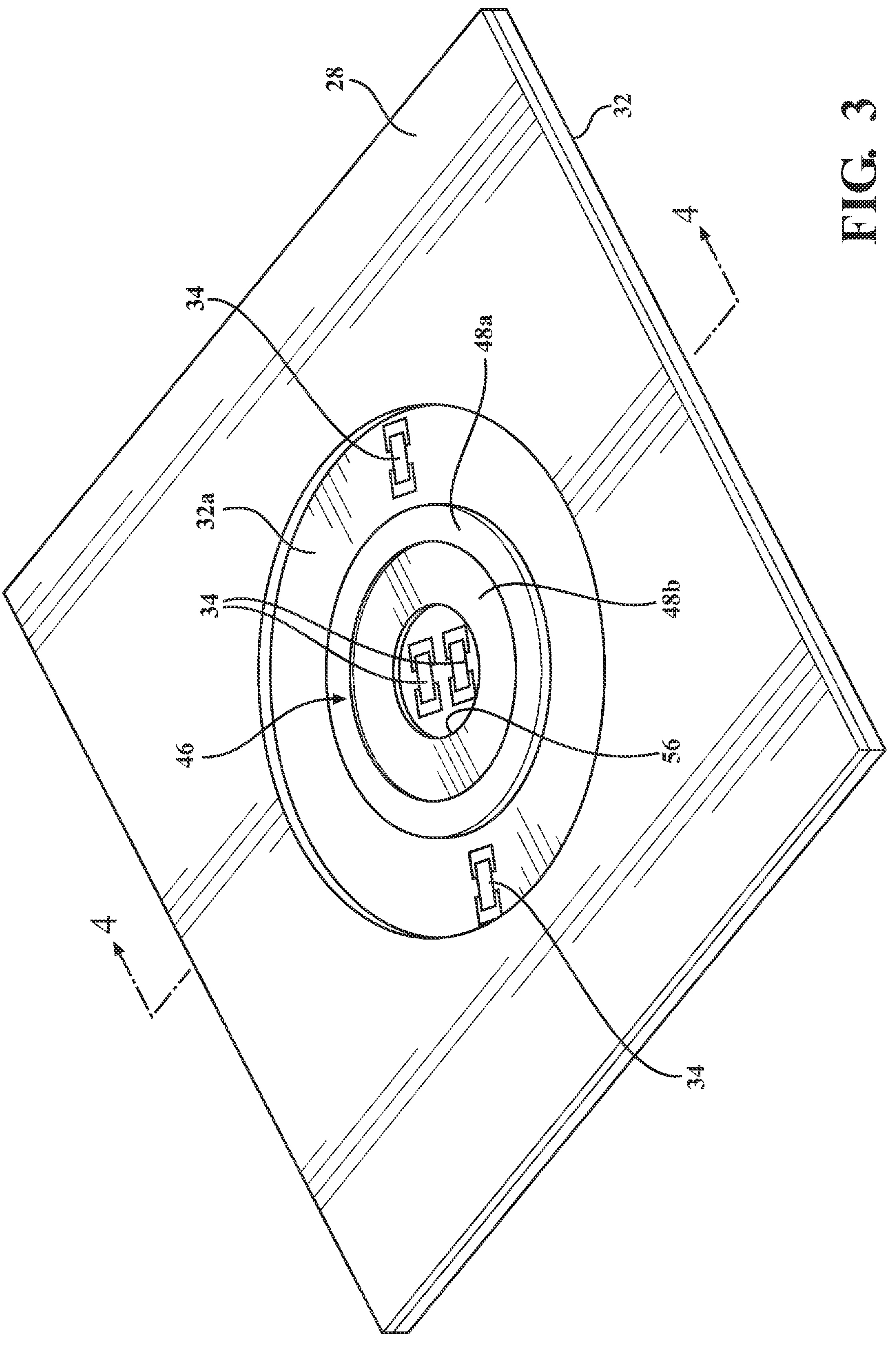
FIG. 3 is a perspective view of an intermediate layer and a stopper connected to a diaphragm substrate, which are part of a MEMS pressure sensing element having a progressive stopper, according to embodiments of the present invention.
Figure 4:
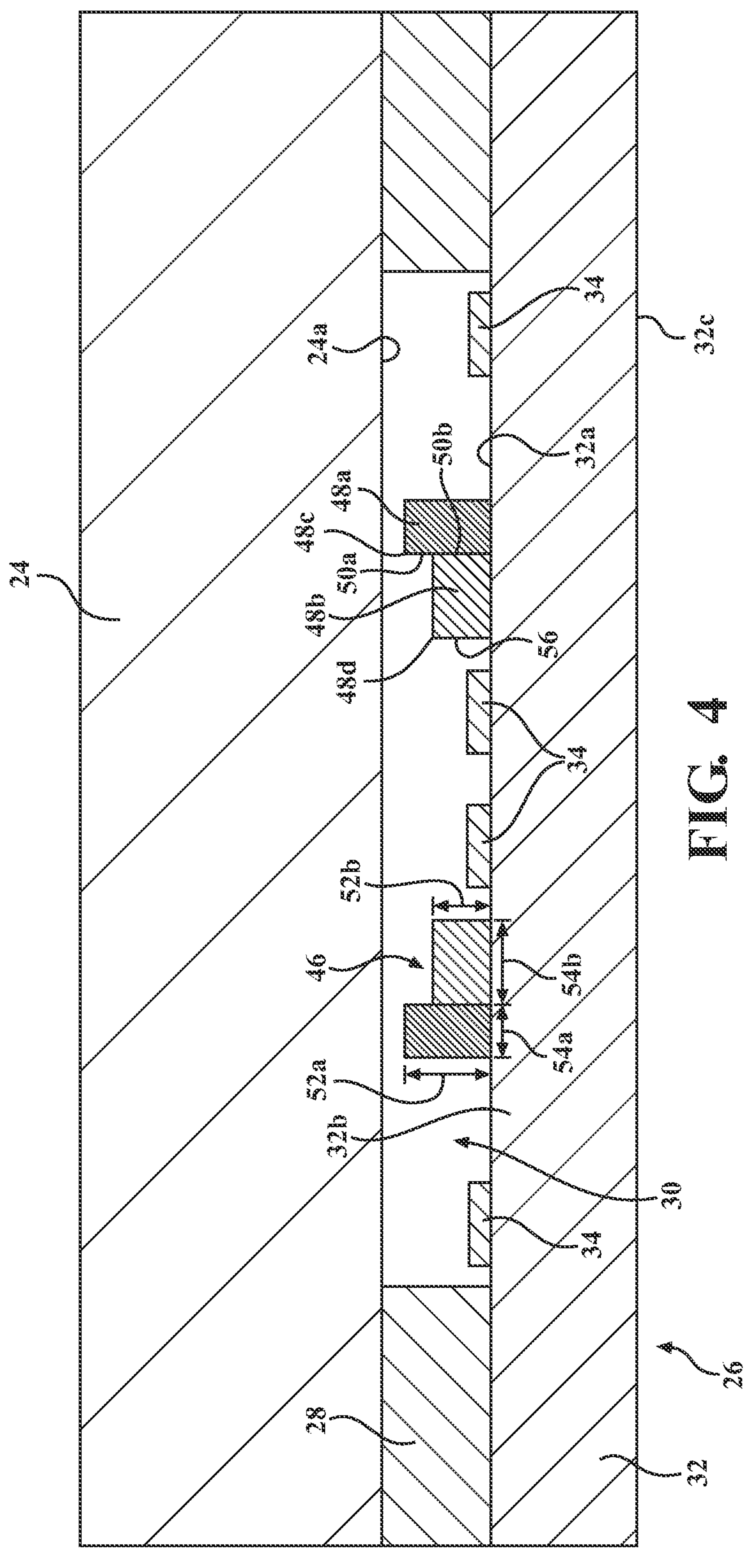
FIG. 4 is a sectional view taken along lines 4-4 of FIG. 3, where a support substrate is attached to the intermediate layer.

Referring to FIGS. 1 and 2, a pressure sensor assembly having a pressure sensing element which includes at least one progressive stopper according to the present invention is shown generally at 10. The pressure sensor assembly 10 is an absolute pressure sensor, and includes a connector 12 which is molded around part of an aluminum housing 14. Integrally formed as part of the connector 12 are several apertures 16, and a portion of a corresponding spring 18 is located in each aperture 16. Although two springs 18 are shown in two corresponding apertures 16, it is within the scope of the invention that more or less springs 18 being disposed in corresponding apertures 16 may be used. Also formed as part of the connector 12 is a cavity, shown generally at 20. Disposed in the cavity 20 is circuitry, which is part of a signal conditioning Application Specific Integrated Circuit (ASIC), shown generally at 22, mounted to a support substrate 24, where the support substrate 24 is part of a pressure sensing element, shown generally at 26. The pressure sensing element 26 also includes an intermediate layer 28, which in this embodiment is made of printed sealing glass, and the intermediate layer 28 includes a cavity, shown generally at 30 in FIG. 4. With reference to FIGS. 3-4, the pressure sensing element 26 is formed by the support substrate 24 and a diaphragm substrate 32 bonded by the intermediate layer 28, where the intermediate layer 28 is disposed between the support substrate 24 and the diaphragm substrate 32. More specifically, the intermediate layer 28 is mounted to an outer surface 32*a* of the diaphragm substrate 32. The area of the diaphragm substrate 32 which is not in contact with the intermediate layer 28 is a diaphragm 32*b*, which deflects when exposed to pressurized fluid. The diameter of the diaphragm 32*b* corresponds to the inner diameter of the intermediate layer 28. Mounted to the outer surface 32*a* of the diaphragm substrate 32 is a plurality of printed resistors 34, which in this embodiment are piezoresistors, and together the resistors 34 function as a sensing bridge, or Wheatstone bridge. The resistors 34 are in electrical connection with each other and the signal from the resistors 34 representing the output voltage is transferred to the ASIC 22. Referring again to FIGS. 1-2, the substrate 24 is supported by the springs 18, and the use of the springs 18 allows for the location of the pressure sensing element 26 to accommodate various tolerances, and still maintain proper electrical connections, and for the ASIC 22 to be properly located in the cavity 20.

In contact with the back surface of the diaphragm substrate 32 is an O-ring 38, and the O-ring 38 is partially disposed in a recess 40 formed as part of a port 42. Integrally formed as part of the port 42 is a threaded portion, shown generally at 44, which is used to connect the pressure sensor assembly 10 to another component. A second O-ring may be located on an outer surface of the port 42 such that the threaded portion 44 extends through the second O-ring, providing sealing between the port 42 and another component.

Referring to FIGS. 3-4, several components of the pressure sensing element 26 are shown. In addition to the resistors 34, also disposed in the cavity 30 is a progressive stopper, shown generally at 46. In the embodiment shown, the progressive stopper 46 is a dual-contact ring-over-ring progressive stopper 46. The progressive stopper 46 in this embodiment includes an outer or first stopper ring 48*a* and an inner or second stopper ring 48*b*. The first stopper ring 48*a* and the second stopper ring 48*b* are both attached to the outer surface 32*a* of the diaphragm substrate 32. The first stopper ring 48*a* circumscribes and is in contact with the second stopper ring 48*b*. More specifically, as shown in FIG. 4, the inner surface 50*a* of the first stopper ring 48*a* is in contact with the outer surface 50*b* of the second stopper ring 48*b*. The height 52*a* of the first stopper ring 48*a* is greater than the height 52*b* of the second stopper ring 48*b*. The first stopper ring 48*a* includes a first contact area 48*c*, which is an inner edge of the first stopper ring 48*a*, and the second stopper ring 48*b* includes a second contact area 48*d*, which is an inner edge of the second stopper ring 48*b*.

The second stopper ring 48*b* also includes an aperture 56, and two of the resistors 34 are connected to the outer surface 32*a* of the diaphragm substrate 32 in a manner to be disposed in the aperture 56.

In addition to the support substrate 24, the springs 18 are in contact with a leadframe 58, and the leadframe 58 includes several pins 60. The pins 60 may be connected to another connector (not shown) for transmitting the signal to an external device, such as a controller.

During operation, pressure is applied to an exposed surface 32*c* of the diaphragm substrate 32, this pressure causes the diaphragm 32*b* to deflect, such that there are strains on the resistors 34 printed on the diaphragm 32*b*. These strains cause a change in the output voltage of the resistors 34, and the signal of this output voltage is transferred to the ASIC 22 for amplification and calibration.

Figure 5:
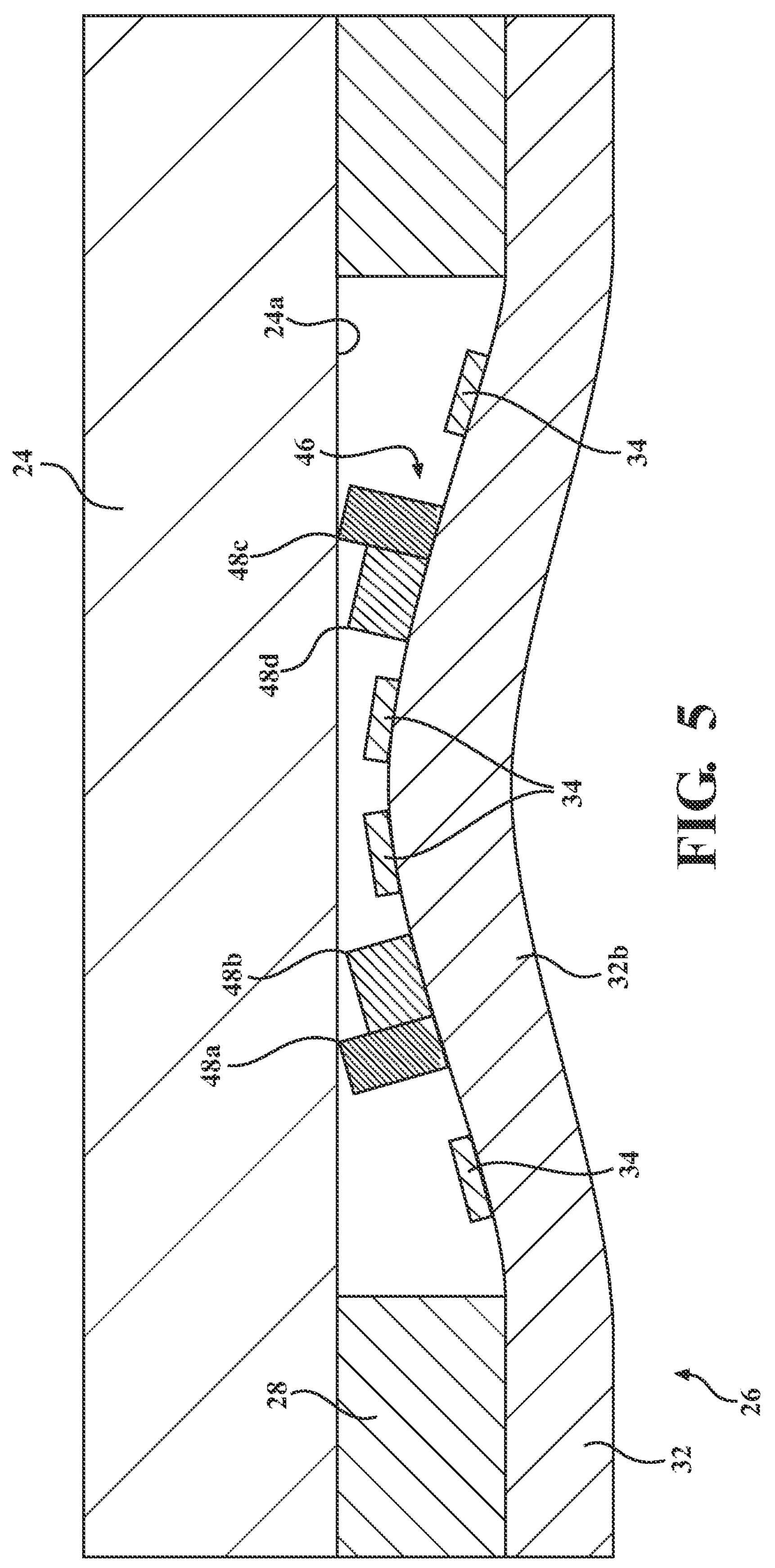
FIG. 5 is a sectional view of a MEMS pressure sensing element having a progressive stopper with a contact area in contact with the support substrate when the diaphragm is exposed to pressure, according to embodiments of the present invention.
Figure 6:
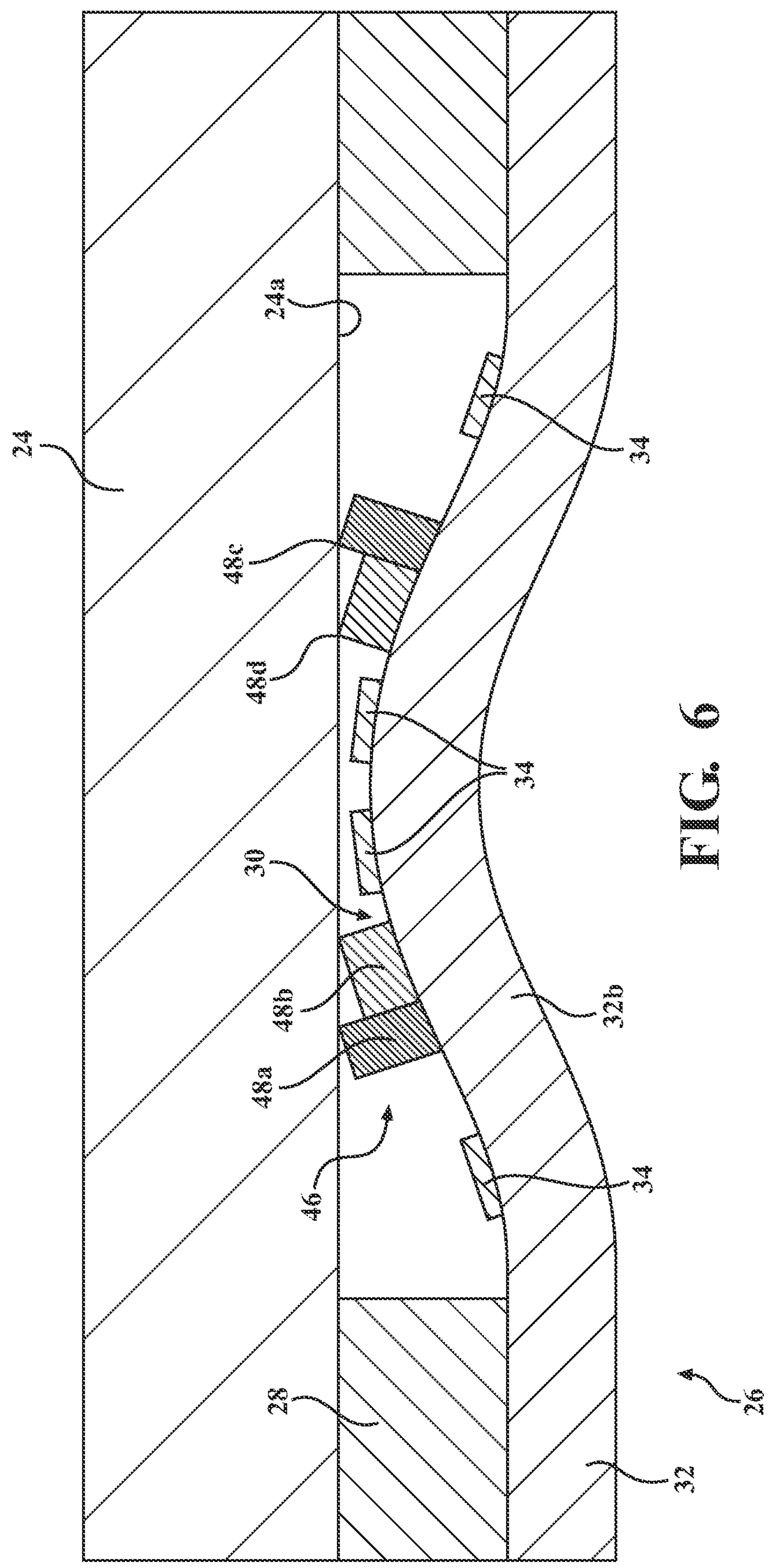
FIG. 6 is a second sectional view of a MEMS pressure sensing element having a progressive stopper with two contact areas in contact with the support substrate when the diaphragm is exposed to pressure, according to embodiments of the present invention.
Figure 7:
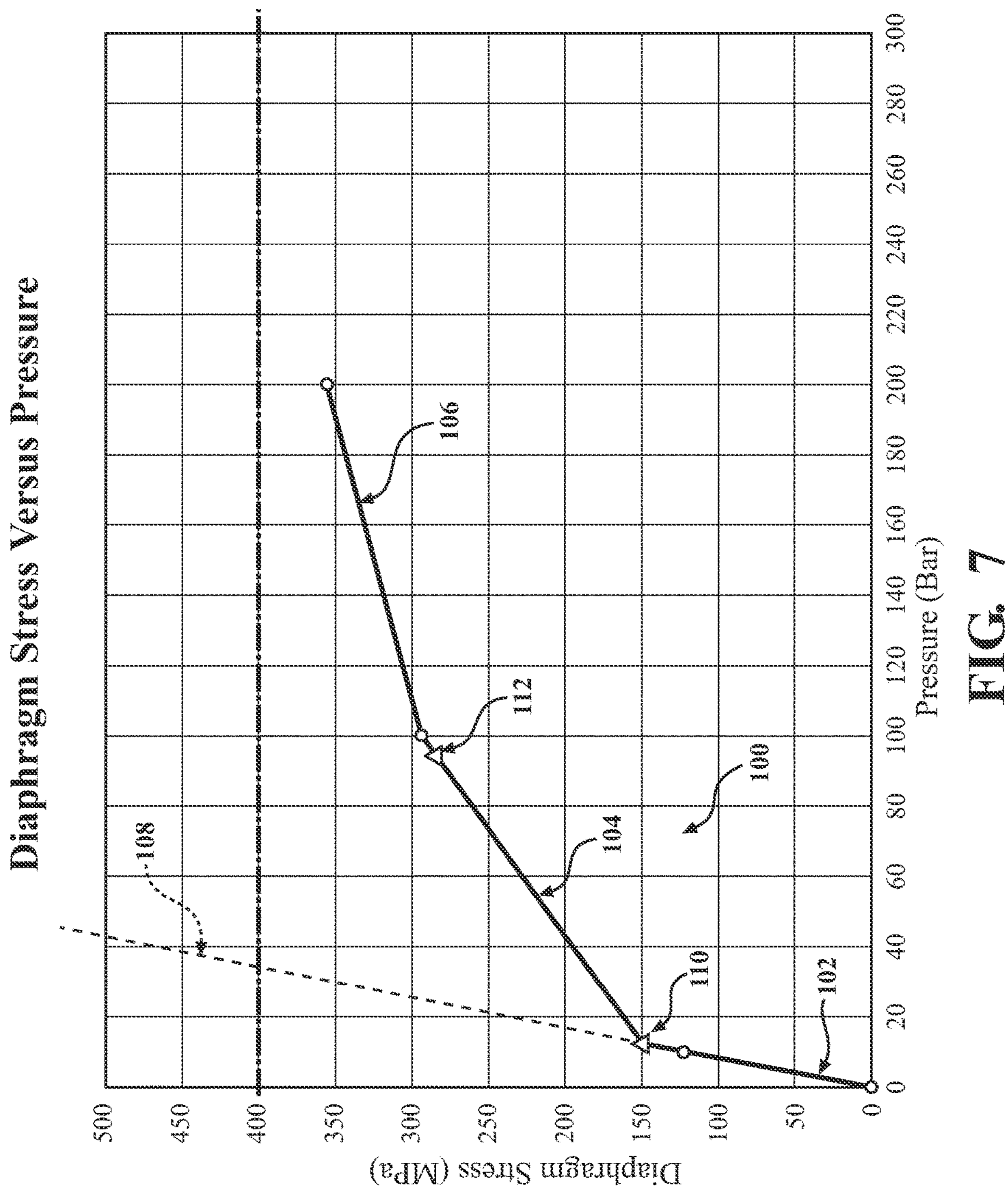
FIG. 7 is a graph depicting stress versus pressure applied to the diaphragm of a MEMS pressure sensing element having a progressive stopper having multiple contacts, according to embodiments of the present invention.

FIG. 7 is a chart depicting a curve, shown generally at 100, of diaphragm stress versus pressure applied to the diaphragm 32*b* when pressure is applied to the diaphragm 32*b* of the pressure sensor assembly 10 shown in FIGS. 4-6. The curve 100 includes three regions, a first region 102, a second region 104, and a third region 106. The first region 102 of the curve 100 represents the required measurable pressure sensing range for this embodiment.

The chart in FIG. 7 also includes another curve 108, which represents the diaphragm stress versus pressure if the gap between the diaphragm 32*b* and the support substrate 24 is large enough, such that there is a non-contact condition between the diaphragm 32*b* and the support substrate 24 (or the progressive stopper 46 is not used). Following the curve 108, an edge of the diaphragm 32*b* may crack when the pressure is around 33 Bar and the stress of the diaphragm 32*b* reaches the ceramic flexural strength at around 400 MPa.

Referring now to FIGS. 4 and 7, the linear elasticity of the diaphragm 32*b* is such that when pressure is initially applied to the diaphragm 32*b*, the progressive stopper 46 does not contact the support substrate 24. As the pressure applied to the diaphragm 32*b* increases, the further the diaphragm 32*b* deflects. The rate of increase in stress of the diaphragm 32*b* when the pressure is between 0 Bar and less than 10 Bar is shown in the first region 102 of the curve 100 in FIG. 7. However, as depicted in FIG. 5, once the pressure applied to the diaphragm 32*b* reaches above 10 Bar, the first contact area 48*c* of the first stopper ring 48*a* contacts the lower surface 24*a* of the support substrate 24, which is represented on the curve 100 by the first contact 110 in FIG. 7. Also, once the pressure applied to the diaphragm 32*b* is above 10 Bar and the first contact area 48*c* is in contact with the lower surface 24*a* as shown in FIG. 5, as the pressure increases, the stress of the diaphragm 32*b* continues to increase, but increases at a lower rate compared to the rate at which the stress of the diaphragm 32*b* increases when exposed to pressures between 0 Bar and slightly higher than 10 Bar (i.e., compared to the first region 102). This lower rate of increase in stress on the diaphragm 32*b* is represented in the second region 104 of the curve 100 in FIG. 7.

Referring now to FIG. 6, the pressure sensing element 26 is shown when the diaphragm substrate 32 is exposed to pressure near 100 Bar. When the pressure is near 100 Bar, both the first contact area 48*c* of the first stopper ring 48*a* and the second contact area 48*d* of the second stopper ring 48*b* are in contact with the lower surface 24*a* of the support substrate 24, represented on the curve 100 by the second contact 112 in FIG. 7. Once the pressure applied to the diaphragm 32*b* is above the second contact 112 (i.e., the pressure is near 100 Bar), the stress of the diaphragm 32*b* continues to increase, but increases at a lower rate compared to the rate at which the stress of the diaphragm 32*b* increases from the first contact 110 (where the pressure is slightly above 10 Bar) to the second contact 112 (where the pressure is near 100 Bar). This is shown in the third region 106 of the curve 100 in FIG. 7. The third region 106 of the curve 100 in FIG. 7 represents a pressure increase from the second contact 112 (when the pressure level near 100 Bar) to 200 Bar, and the corresponding increase in stress on the diaphragm 32*b*.

In the embodiment shown, the maximum flexural strength of the diaphragm substrate 32 is 400 MPa. The stopper rings 48*a*, 48*b* counteract some of the force applied to the diaphragm substrate 32, such that increased pressure up to 200 Bar may be applied to the diaphragm substrate 32, and the structural integrity of the diaphragm substrate 32 may be maintained. Additionally, the resistors 34 are able to generate an output voltage which is representative of pressures ranging from 0 to 10 Bar, with desired accuracy, even after the diaphragm substrate 32 is exposed to pressures up to 200 Bar.

The first stopper ring 48*a* has a width 54*a*, and the second stopper ring 48*b* also has a width 54*b*. Varying the heights 52*a*,52*b* and the widths 54*a*,54*b* of the stopper rings 48*a*,48*b* may also change the shape of the curve 100 in FIG. 7, and the locations of the contacts 110, 112 along the curve 100, depending upon the application, and the shape and orientation of the progressive stopper 46.

Figures 8, 9, 10:
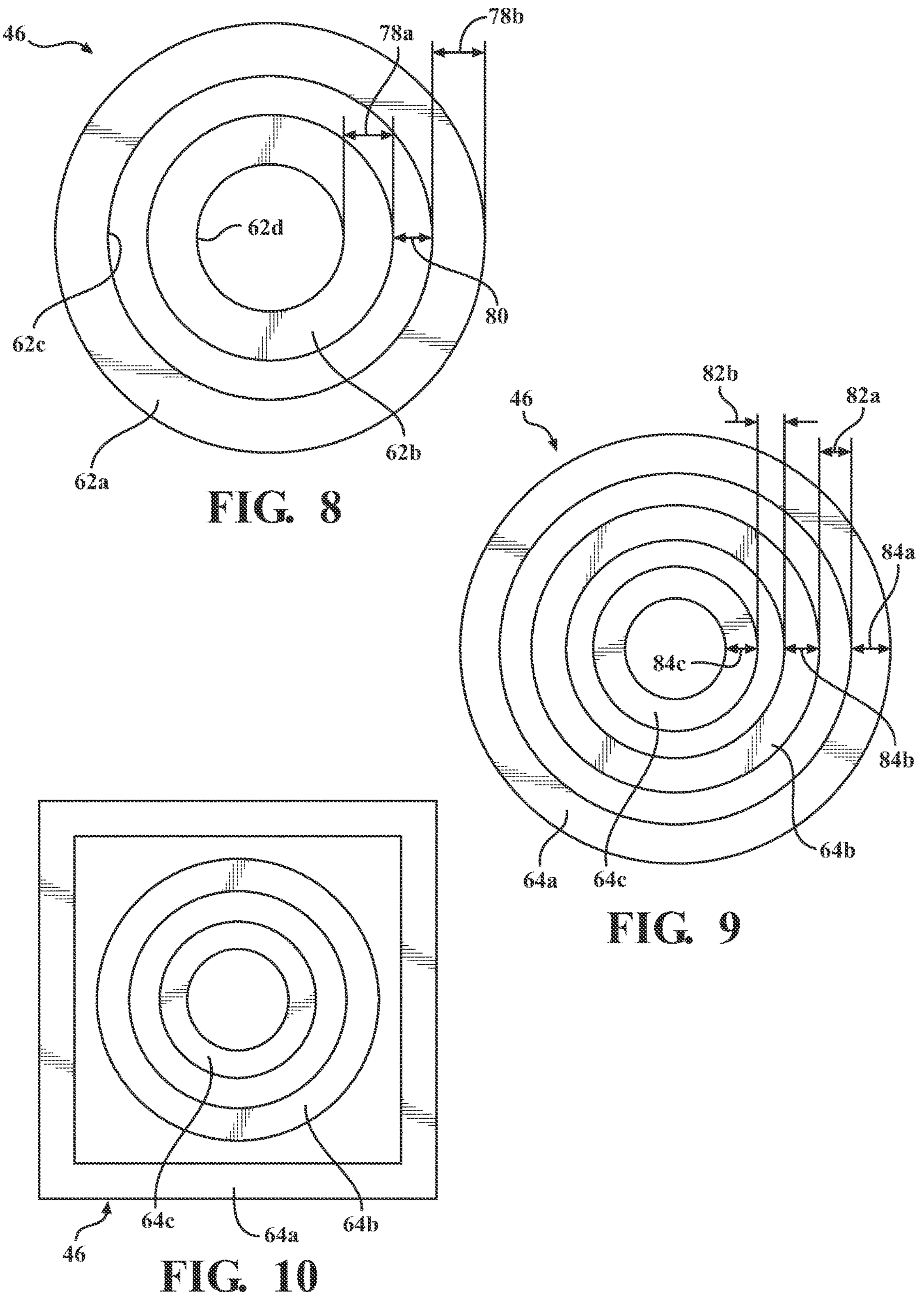
FIG. 8 is a top view of second embodiment of progressive stopper used as part of a MEMS pressure sensing element having a progressive stopper, according to embodiments of the present invention.
FIG. 9 is a top view of third embodiment of progressive stopper used as part of a MEMS pressure sensing element having a progressive stopper, according to embodiments of the present invention.
FIG. 10 is a top view of fourth embodiment of progressive stopper used as part of a MEMS pressure sensing element having a progressive stopper, according to embodiments of the present invention.

An alternate embodiment of the progressive stopper 46 according to present invention is shown in FIG. 8, with like numbers referring to like elements. In the embodiment shown, an outer stopper ring 62*a* and an inner stopper ring 62*b* are printed on the outer surface 32*a* of the diaphragm substrate 32. As with the previous embodiment, the height of the outer stopper ring 62*a* is greater than the height of the inner stopper ring 62*b*, such that when the diaphragm 32*b* deflects, a contact area 62*c* of the outer stopper ring 62*a* contact comes into contact with the lower surface 24*a* of the support substrate 24 when the pressure is higher than 10 Bar. Additionally, both the contact area 62*c* of the outer stopper ring 62*a* and a contact area 62*d* of the inner stopper ring 62*b* come into contact with the lower surface 24*a* of the support substrate 24 when the pressure is near 100 Bar. In this embodiment, the contact area 62*c* is an outer edge of an inner radius formed as part of the outer stopper ring 62*a*, and the contact area 62*d* is an outer edge of an inner radius formed as part of the inner stopper ring 62*b*. In this embodiment, the widths 78*a*,78*b* of the stopper rings 62*a*,62*b* are approximately the same, but it is within the scope of the invention that the widths 78*a*,78*b* of the stopper rings 62*a*,62*b* may be varied in other embodiments such that the progressive stopper 46 shown in FIG. 8 may be suitable for use in other applications having various pressure ranges. In this embodiment, there is spacing 80 in between the stopper rings 62*a*,62*b*, such that the stopper rings 62*a*,62*b* are not in contact with one another. Varying the widths 78*a*,78*b* and the spacing 80 would change the shape of the curve 100 in FIG. 7, and the locations of the contacts 110,112 along the curve 100, depending upon the application, and the shape and orientation of the progressive stopper 46.

Also, in this embodiment, alternatively, the outer stopper ring 62*a* may be mounted to the lower surface 24*a* of the support substrate 24 and the inner stopper ring 62*b* is printed on the outer surface 32*a* of the diaphragm substrate 32. Furthermore, the inner stopper ring 62*b* may be mounted to the lower surface 24*a* of the support substrate 24 and the outer stopper ring 62*a* may be printed on the outer surface 32*a* of the diaphragm substrate 32. In yet another embodiment, both the outer stopper ring 62*a* and the inner stopper ring 62*b* may be mounted to the lower surface 24*a* of the support substrate 24.

Another alternate embodiment of the present invention is shown in FIG. 9. In FIG. 9, the progressive stopper 46 includes three approximately concentric stoppers. The outer stopper ring 64*a*, the middle stopper ring 64*b*, and the inner stopper ring 64*c* are all circular. The middle stopper ring 64*b* has a smaller diameter than the outermost stopper ring 64*a*, and the inner stopper ring 64*c* has a smaller diameter than the middle stopper ring 64*b*. Furthermore, in this embodiment, the outer stopper ring 64*a* is the tallest of the three rings 64*a*,64*b*,64*c* and contacts the lower surface 24*a* of the support substrate 24 first when the pressure applied to the diaphragm 32*b* is above a first predetermined value. The middle stopper ring 64*b* has a height which is taller than the inner stopper ring 64*c* but less than the outer stopper ring 64*a*, such that the middle stopper ring 64*b* contacts the lower surface 24*a* of the support substrate 24 second when the pressure applied to the diaphragm 32*b* is above a second predetermined value. The inner stopper ring 64*c* is the shortest of the three rings 64*a*,64*b*,64*c*, and contacts the lower surface 24*a* of the support substrate 24 third when the pressure applied to the diaphragm 32*b* is above a third predetermined value. The spacing 82*a*, 82*b* between each of the stopper rings 64*a*,64*b*,64*c* is approximately the same, and the widths 84*a*,84*b*,84*c* of each of the stopper rings 64*a*,64*b*,64*c* is approximately the same, but it is within the scope of the invention that the stopper rings 64*a*,64*b*,64*c* may be various widths 84*a*,84*b*,84*c* and have various spacing 82*a*,82*b* in other embodiments to accommodate other applications. Varying the widths 84*a*,84*b*,84*c* and the spacing 82*a*,82*b* would change the shape of the curve 100 in FIG. 7, and the locations of the contacts 110,112 along the curve 100, depending upon the application, and the shape and orientation of the progressive stopper 46.

Another alternate embodiment of the present invention is shown in FIG. 10, with like numbers referring to like elements. In this embodiment, the outer stopper ring 64*a* is square-shaped. It should be noted that it is within the scope of the invention that the various embodiments of the progressive stopper 46 may include any number of rings with various shapes having a decrease in height from the outermost stopper ring to the innermost stopper ring, such that multiple contacts are formed at various pressure levels to limit the deformation of the diaphragm substrate 32, reducing the stress of the diaphragm 32*b* when high pressure is applied to the exposed surface 32*c* of the diaphragm substrate 32. Limiting the stress of the diaphragm 32*b* is such that the resistors 34 are able to generate an output voltage which is representative of pressures ranging from 0 to 10 Bar, with desired accuracy, even after the diaphragm substrate 32 is exposed to pressures up to 200 Bar.

The embodiments of the progressive stopper 46 shown in FIGS. 8-10 are shown with spacing between the stopper rings 64*a*,64*b*,64*c*. However, it is within the scope of the invention that in addition to being approximately concentric, the stopper rings 64*a*,64*b*,64*c* may also be adjacent and in contact with one another.

Figure 11:
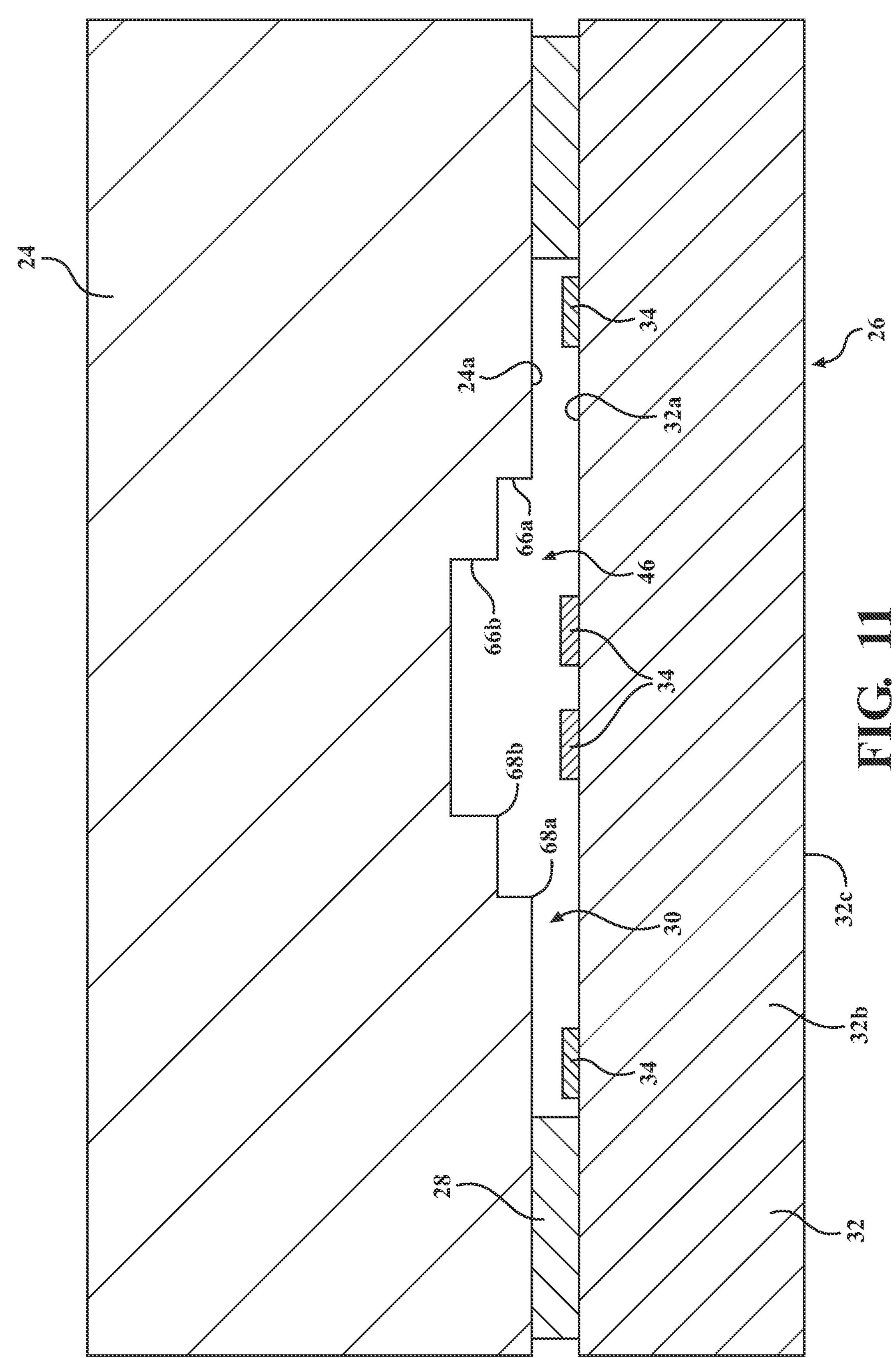
FIG. 11 is a sectional view of an embodiment of a MEMS pressure sensing element having a progressive stopper formed as part of a support substrate, according to embodiments of the present invention.

Another embodiment of the present invention is shown in FIG. 11, with like numbers referring to like elements. In this embodiment, the progressive stopper 46 is a plurality of recesses formed as part of the support substrate 24. More specifically, the progressive stopper 46 is two recesses, such that the progressive stopper 46 in this embodiment is a dual-stepped progressive stopper 46. In the embodiment shown in FIG. 11, a first recess 66*a*, and a second recess 66*b* are formed as part of the support substrate 24, and each of the recesses 66*a*,66*b* are cylindrical in shape. The first recess 66*a* has a contact area 68*a*, which is an edge of the first recess 66*a*, and the second recess 66*b* also has a contact area 68*b*, which is an edge of the second recess 66*b*. The contact area 68*a* of the first recess 66*a* contacts the outer surface 32*a* of the diaphragm substrate 32 once the pressure applied to the diaphragm 32*b* reaches a first predetermined value, which is above 10 Bar. As the pressure applied to the diaphragm 32*b* continues to increase, the stress applied to the contact area 68*a* also continues to increase.

The contact area 68*b* of the second recess 66*b* is does not contact the outer surface 32*a* of the diaphragm substrate 32 until the pressure applied to the diaphragm 32*b* reaches at or above a second predetermined value, which in this embodiment is near 100 Bar. Once the pressure applied to the diaphragm 32*b* is above the second predetermined value, the contact area 68*b* of the second recess 66*b* comes in contact with the outer surface 32*a* of the diaphragm substrate 32. Both contacts areas 68*a*,68*b* are in contact with the outer surface 32*a* of the diaphragm substrate 32 when the pressure applied to the diaphragm 32*b* is between the second predetermined value and 200 Bar.

Figure 12:
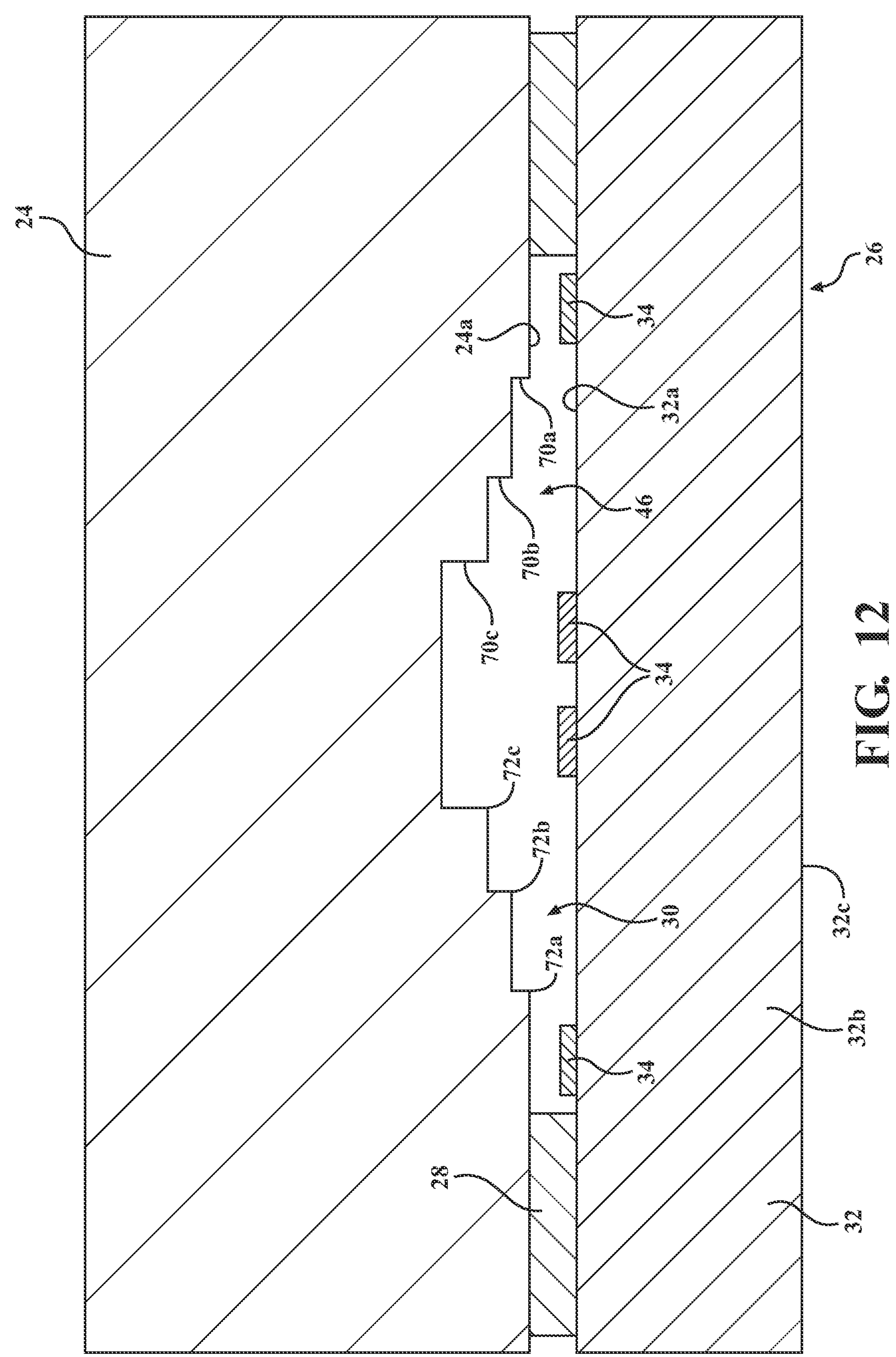
FIG. 12 is a sectional view of another embodiment of a MEMS pressure sensing element having a progressive stopper formed as part of a support substrate, according to embodiments of the present invention.

Another embodiment of the present invention is shown in FIG. 12, with like numbers referring to like elements. In this embodiment, the progressive stopper 46 is three recesses formed as part of the support substrate 24, such that the progressive stopper 46 in this embodiment is a triple-recessed progressive stopper 46. More specifically, there is a first recess 70*a*, a second recess 70*b*, and a third recess 70*c*. Each of the recesses 70*a*,70*b*,70*c* is generally cylindrical in shape, and has a corresponding contact area 72*a*,72*b*,72*c*. The first contact area 72*a* is an edge of the first recess 70*a*, the second contact area 72*b* is an edge of the second recess 70*b*, and the third contact area 72*c* is an edge of the third recess 70*c*. Following is an example to illustrate how the contact areas 72*a*,72*b*,72*c* come into contact with the outer surface 32*a* of the diaphragm substrate 32 in different pressure ranges. In an embodiment, none of the contact areas 72*a*,72*b*,72*c* are in contact with the outer surface 32*a* of the diaphragm substrate 32 when the pressure applied to the diaphragm 32*b* is below a first predetermined value above 10 Bar, such as 12 Bar. The first contact area 72*a* comes into contact with the outer surface 32*a* of the diaphragm substrate 32 when the pressure is at or above 12 Bar. The first contact area 72*a* and the second contact area 72*b* come into contact with the outer surface 32*a* of the diaphragm substrate 32 when the pressure is at a second predetermined value near 70 Bar, and all three contact areas 72*a*,72*b*,72*c* are in contact with the outer surface 32*a* of the diaphragm substrate 32 when the pressure applied to the diaphragm 32*b* is at a third predetermined value near 120 Bar. In this embodiment, the maximum diaphragm stress is 300 MPa. It should be noted that the size and shape of the recesses 70*a*,70*b*,70*c* may be varied such that the contact areas 72*a*,72*b*,72*c* come into contact with the outer surface 32*a* of the diaphragm substrate 32 at different pressure levels to suit any particular application.

Figure 13:
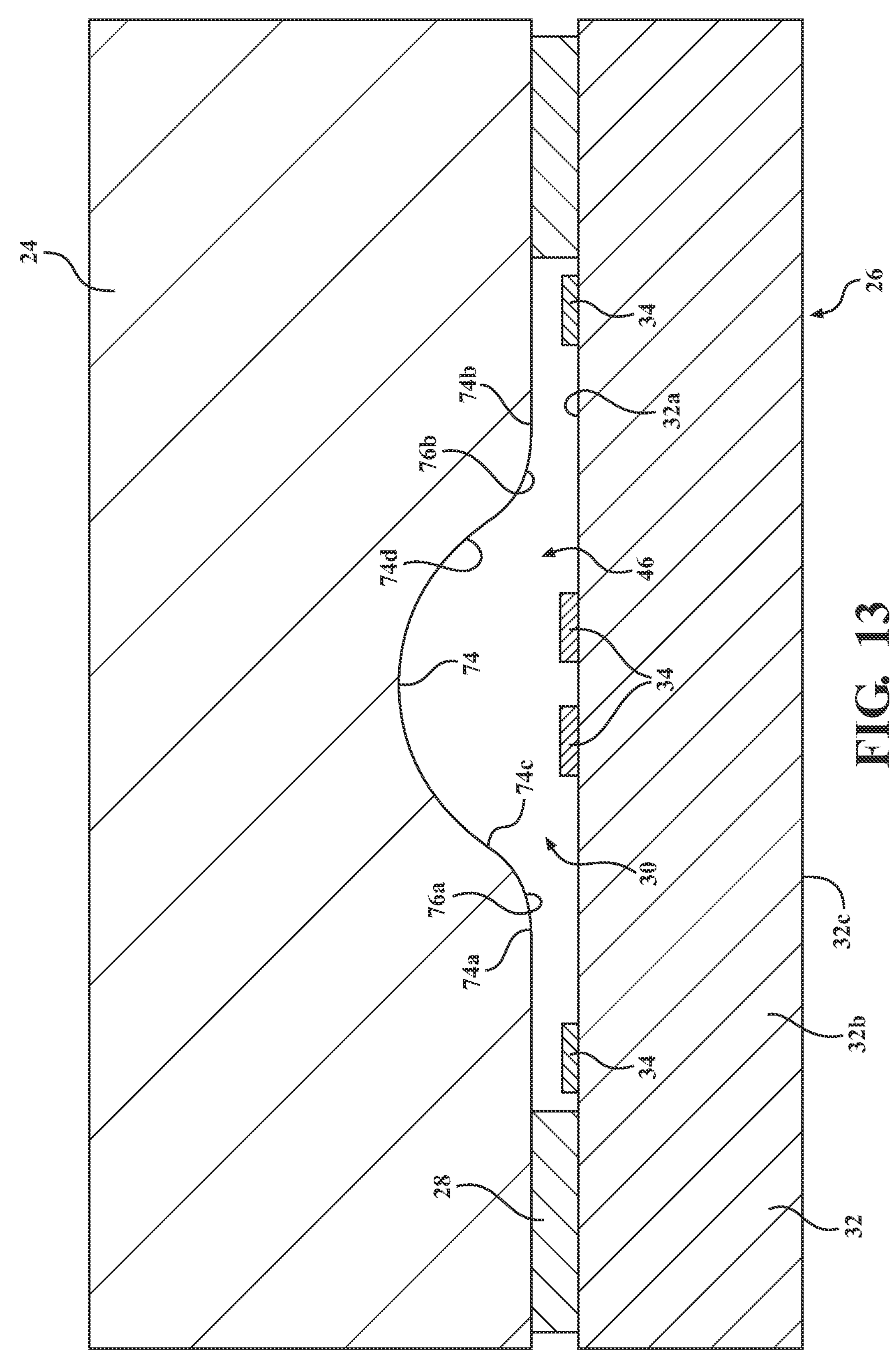
FIG. 13 is a sectional view of yet another embodiment of a MEMS pressure sensing element having a progressive stopper formed as part of a support substrate, according to embodiments of the present invention.

Another embodiment of the present invention is shown in FIG. 13, with like numbers referring to like elements. In this embodiment, the progressive stopper 46 is a curved recess 74. The profile of the curved recess 74 is formed by two symmetrical S-shaped curves. The curved recess 74 has contact areas 76*a*,76*b* next to the edges 74*a*,74*b* of the curved recess 74. Each S-shaped curve of the curved recess 74 also includes an inflection point 74*c*,74*d*, respectively, where the inflection point 74*c* is adjacent the first contact area 76*a*, and the other inflection point 74*d* is adjacent the second contact area 76*b*. The shape of the curved recess 74 may be varied such that the outer surface 32*a* of the diaphragm substrate 32 contacts the contact areas 76*a*,76*b* when pressure is applied to the diaphragm 32*b*.

Figure 14:
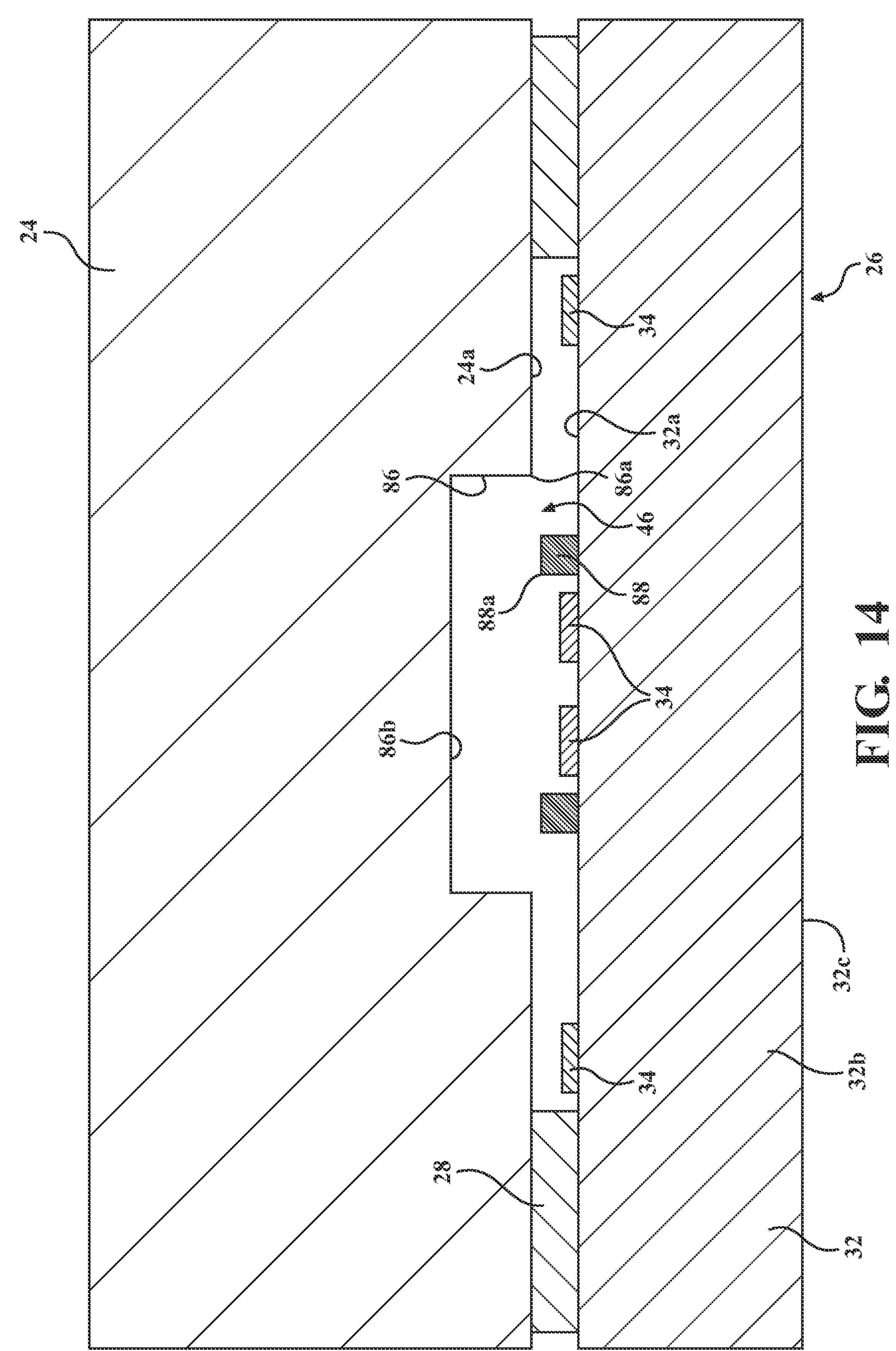
FIG. 14 is a sectional view of an embodiment of a MEMS pressure sensing element having portions of a progressive stopper formed as part of a support substrate and a diaphragm substrate, according to embodiments of the present invention.

Another embodiment of the present invention is shown in FIG. 14, with like numbers referring to like elements. In this embodiment, the progressive stopper 46 is a combination stopper, where a recess 86 is formed as part of the support substrate 24, and a stopper ring 88 is mounted to the outer surface 32*a* of the diaphragm substrate 32. The recess 86 in one embodiment is circular, and has a contact area 86*a*, which is an edge of the recess 86. The stopper ring 88 includes a contact area 88*a*, which is an outer edge of an inner radius formed as part of the stopper ring 88. The recess 86 has an inner surface 86*b* which may come into contact with the contact area 88*a* when pressure is applied to the diaphragm 32*b*.

During operation, once the pressure applied to the diaphragm 32*b* reaches above a first predetermined value, the contact area 86*a* of the recess 86 contacts the outer surface 32*a* of the diaphragm substrate 32. Once the pressure applied to the diaphragm 32*b* reaches above a second predetermined value, the contact area 86*a* of the recess 86 is in contact with the outer surface 32*a* of the diaphragm substrate 32, and the inner surface 86*b* of the recess 86 is in contact with the contact area 88*a* of the stopper ring 88, limiting the diaphragm stress.

Figure 15:
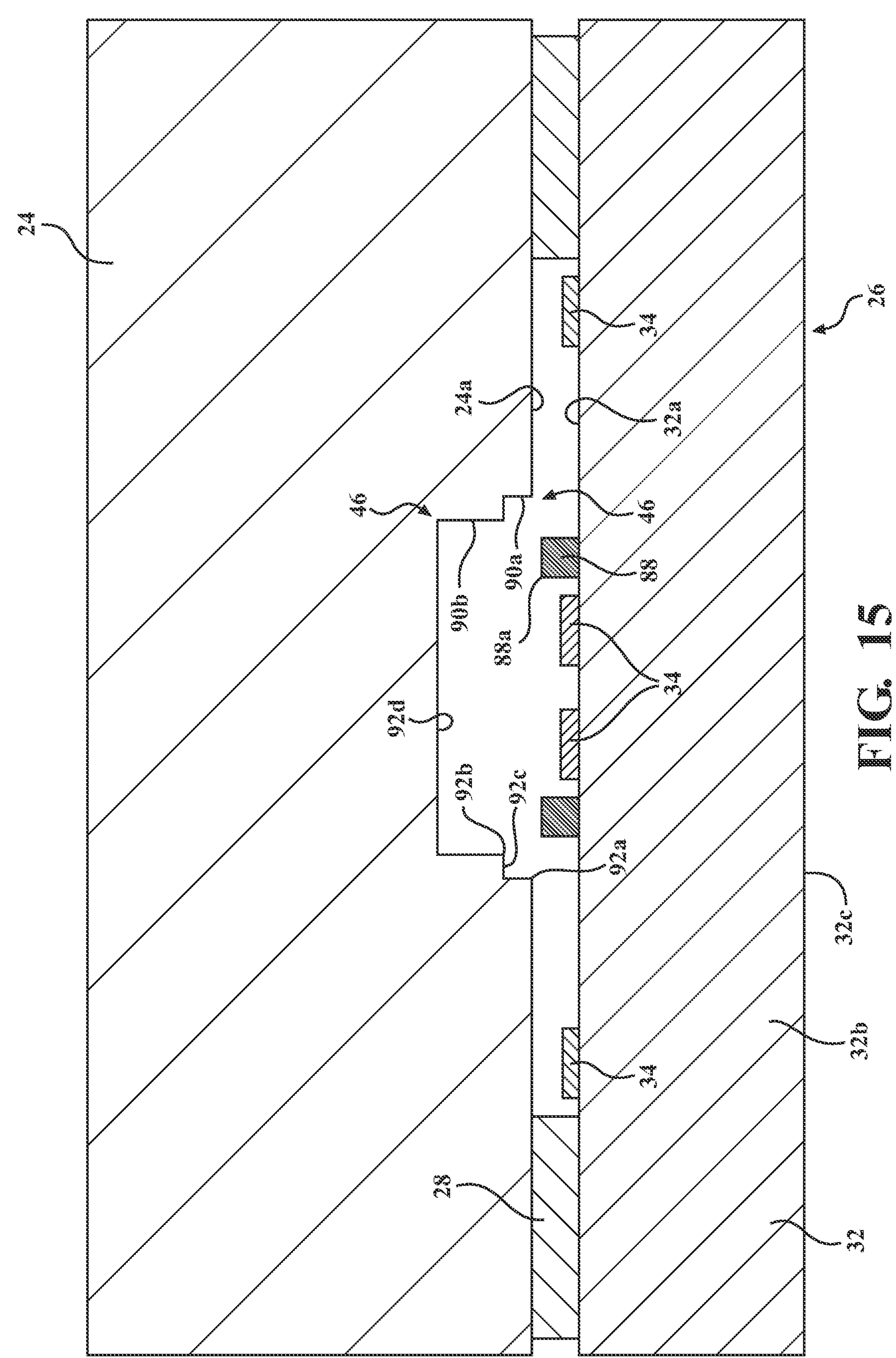
FIG. 15 is a sectional view of another embodiment of a MEMS pressure sensing element having portions of a progressive stopper formed as part of a support substrate and a diaphragm substrate, according to embodiments of the present invention.

Another embodiment of the present invention is shown in FIG. 15, with like numbers referring to like elements. This embodiment is similar to the embodiment shown in FIG. 14, the progressive stopper 46 and is also a combination stopper, but in this embodiment, there are two circular recesses formed as part of the support substrate 24. There is a first recess 90*a* having a contact area 92*a*, which is an edge of the first recess 90*a*, and the second recess 90*b* having a contact area 92*b*, which is an edge of the second recess 90*b*. The first recess 90*a* includes an inner surface 92*c*, and the second recess 90*b* also includes an inner surface 92*d*.

During operation, once the pressure applied to the diaphragm 32*b* reaches above a first predetermined value, the contact area 92*a* of the recess 90*a* contacts the outer surface 32*a* of the diaphragm substrate 32 as a first contact. Once the pressure applied to the diaphragm 32*b* reaches above a second predetermined value, the contact area 92*a* of the recess 90*a* is in contact with the outer surface 32*a* of the diaphragm substrate 32, and the contact area 92*b* of the recess 90*b* contacts the outer surface 32*a* of the diaphragm substrate 32 as a second contact. Once the pressure applied to the diaphragm 32*b* reaches above a third predetermined value, both contact areas 92*a*,92*b* are in contact with the outer surface 32*a* of the diaphragm substrate 32, and the inner surface 92*d* of the recess 90*b* is in contact with the contact area 88*a* as a third contact, limiting the diaphragm stress.

It should be noted that the present invention is not limited to use with a pressure sensing applications, the various embodiments of the progressive stopper 46 described above may be used for any type of device having a flexible membrane where balancing stress distribution and reduction of peak stress are needed. Any of the embodiments of the progressive stopper 46 described may be used with a flexible membrane which is designed to detect pressures over a defined range, even after exposure to high pressures outside of the defined pressure range with a higher safety factor.

Additionally, in any of the embodiments above, the stopper rings are not limited to the shapes shown. The stopper rings shown in the Figures may of any suitable shape, such as, but not limited to, square, rectangular, hexagonal, polygon, or any other shape suitable for limiting the deformation of the diaphragm 32*b*. The stopper rings may be printed on the diaphragm substrate 32, or the stopper rings may be coated, plated, or otherwise deposited on the diaphragm substrate 32 using any suitable method. The stopper rings shown in FIGS. 3-6, 8-10, and 14-15 may be made of any suitable material, such as, but not limited to, glass, ceramics, metal, or a polymer. Furthermore, the recesses shown in FIGS. 11-15 may be formed as part of the support substrate 24 by any suitable process, such as, but not limited to, etching or layer by layer sintering.

In other embodiments, with the progressive stopper 46 having sufficient shape, and sufficient spacing between the diaphragm 32*b* and the support substrate 24, the pressure sensor assembly 10 may be able to withstand exposure to higher pressures over 200 Bar, such as 300 Bar. Three or more contacts between the diaphragm 32*b* and the support substrate 24 may be used to change the diaphragm stress versus pressure, which would be represented by flatter regions on the curve 100 (and would be in addition to the regions 102, 104, and 106). Each of FIGS. 9-10, 12, and 15 show example embodiments where the progressive stopper 46 includes three contacts, but other embodiments having three contacts may be contemplated. FIG. 13 demonstrates an embodiment of the progressive stopper 46 with continuous contacts as a result of an increase in pressure.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pressure sensing element, comprising:

a support substrate;

an intermediate layer bonded to the support substrate;

a diaphragm substrate bonded to the intermediate layer; and a diaphragm being part of the diaphragm substrate;

at least one progressive stopper in contact with at least one of the diaphragm substrate or the support substrate when pressure applied to the diaphragm is above a first predetermined value, the at least one progressive stopper further comprising:

a first stopper ring connected to the diaphragm substrate; and a second stopper ring connected to the diaphragm substrate such that the first stopper ring circumscribes, is concentric with, and is in contact with the second stopper ring;

wherein only the first stopper ring contacts the support substrate when the pressure applied to the diaphragm is above the first predetermined value, and both the first stopper ring and the second stopper ring contact the support substrate when the pressure applied to the diaphragm is above a second predetermined value.

2. The pressure sensing element of claim 1, further comprising a third stopper ring circumscribed by the second stopper ring.

3. The pressure sensing element of claim 2, wherein one of the first stopper ring, the second stopper ring, or the third stopper ring is of a square shape.

4. The pressure sensing element of claim 1, wherein the first stopper ring is taller than the second stopper ring.

5. The pressure sensing element of claim 1, further comprising:

a plurality of resistors coupled to the diaphragm such that the plurality of resistors are located between the diaphragm substrate and the support substrate;

wherein at least one of the plurality of resistors is circumscribed by the at least one stopper.

6. A pressure sensor assembly, comprising:

a housing having a port;

a support substrate located in a cavity in the housing;

a sealing glass layer bonded to the support substrate, the sealing glass layer located in the cavity in the housing;

a diaphragm substrate bonded to the sealing glass layer, the diaphragm substrate located in the cavity in the housing;

a diaphragm being part of the diaphragm substrate, the diaphragm selectively exposed to fluid pressure in the port;

a plurality of resistors coupled to the diaphragm such that the plurality of resistors are located between the diaphragm substrate and the support substrate; and at least one progressive stopper integrally formed with one of the diaphragm substrate or the support substrate, the at least one progressive stopper further comprising:

a first stopper ring connected to the diaphragm substrate;

a second stopper ring connected to the diaphragm substrate such that the first stopper ring circumscribes, is concentric with, and is in contact with the second stopper ring;

wherein only the first stopper ring is in contact with the support substrate when pressure applied to the diaphragm is above a first predetermined value, and both the first stopper ring and the second stopper ring are in contact with the support substrate when pressure applied to the diaphragm is above a second predetermined value.

7. The pressure sensor assembly of claim 6, wherein the first stopper ring is taller than the second stopper ring.

8. The pressure sensor assembly of claim 6, wherein at least one of the plurality of resistors is circumscribed by the at least one progressive stopper.

9. The pressure sensor assembly of claim 6, the at least one progressive stopper further comprising:

a third stopper ring mounted to the diaphragm substrate such that the third stopper ring is circumscribed by the second stopper ring;

wherein the first stopper ring contacts the support substrate when the pressure applied to the diaphragm is above the first predetermined value, both the first stopper ring and the second stopper ring contact the support substrate when the pressure applied to the diaphragm is above the second predetermined value, and the first stopper ring, the second stopper ring, and the third stopper ring all contact the support substrate when the pressure applied to the diaphragm is above a third predetermined value.

10. The pressure sensor assembly of claim 9, wherein one of the first stopper ring, the second stopper ring, or the third stopper ring is of a square shape.

* * * * *